US012561415B2

(12) United States Patent
Lindskog et al.

(10) Patent No.: US 12,561,415 B2
(45) Date of Patent: Feb. 24, 2026

(54) GENERATION OF CRYPTOGRAPHIC KEYS

(71) Applicant: Telefonaktiebolaget LM Ericsson (publ), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 18/023,666

(22) PCT Filed: Aug. 26, 2020

(86) PCT No.: PCT/EP2020/073885
§ 371 (c)(1),
(2) Date: Feb. 27, 2023

(87) PCT Pub. No.: WO2022/042835
PCT Pub. Date: Mar. 3, 2022

(65) Prior Publication Data
US 2023/0281286 A1     Sep. 7, 2023

(51) Int. Cl.
G06F 21/32         (2013.01)
G06F 21/60         (2013.01)

(52) U.S. Cl.
CPC ............ G06F 21/32 (2013.01); G06F 21/602 (2013.01)

(58) Field of Classification Search
CPC ........ G06F 21/32; G06F 21/602; G06F 21/73; H04L 9/0866; H04L 9/0869; H04L 9/3278; H04L 63/062; H04L 63/0861; H04L 9/3231
See application file for complete search history.

(56) References Cited

U.S. PATENT DOCUMENTS

| | | | |
|---|---|---|---|
| 8,516,269 B1 | 8/2013 | Hamlet et al. | |
| 8,868,923 B1 * | 10/2014 | Hamlet .................. | G06F 21/00 |
| | | | 326/8 |
| 2011/0191837 A1 | 8/2011 | Guajardo et al. | |
| 2016/0328571 A1 | 11/2016 | Duplys et al. | |
| 2019/0123917 A1 | 4/2019 | Kim et al. | |
| 2020/0153624 A1 | 5/2020 | Wentz et al. | |

OTHER PUBLICATIONS

Karimian et al., "Secure and Reliable Biometric Access Control for Resource-Constrained Systems and IoT", arXiv.org, Cornell University Library, Mar. 26, 2018.

* cited by examiner

*Primary Examiner* — Izunna Okeke
(74) *Attorney, Agent, or Firm* — Sage Patent Group

(57)         ABSTRACT

There is provided mechanisms for generating a cryptographic key for a user. The method is performed by a cryptographic key generator device. The method comprises authenticating the user using biometrics data read from the user using a biometrics reader. The method comprises obtaining, only when having authenticated the user, a PUF response from a PUF entity by providing a challenge based on biometrics response data to the PUF entity. The biometrics response data is a function of the biometrics data. The method comprises generating the cryptographic key using a cryptographic function and by seeding the cryptographic function with the PUF response.

24 Claims, 11 Drawing Sheets

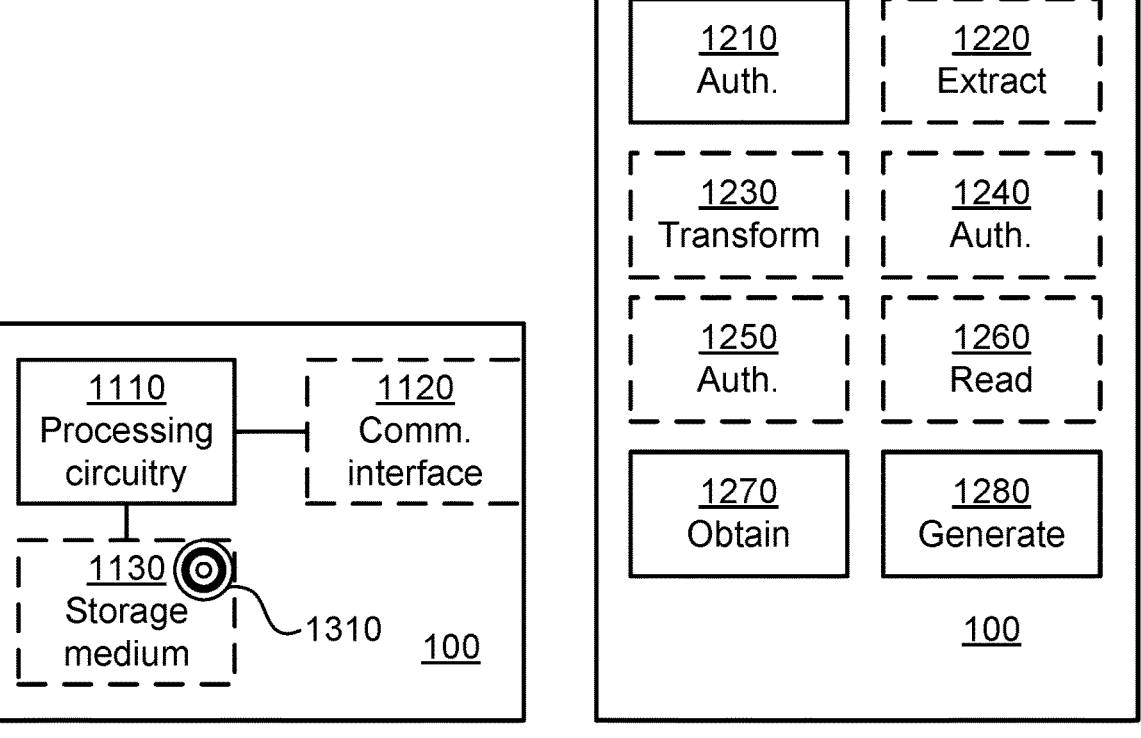
| 1210 Auth. | 1220 Extract |
|:---:|:---:|
| 1230 Transform | 1240 Auth. |
| 1250 Auth. | 1260 Read |
| 1270 Obtain | 1280 Generate |
1100 Processing circuitry — 1120 Comm. interface — 1130 Storage medium — 1310 — 100
100
Fig. 11                    Fig. 12
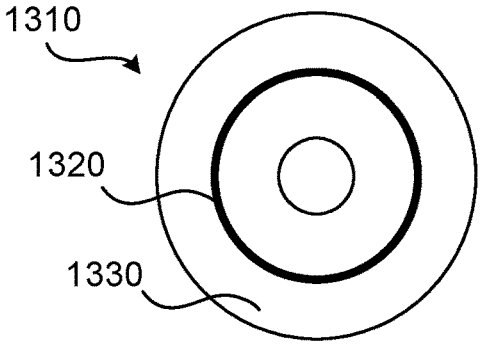
1310
1320
1330
Fig. 13

GENERATION OF CRYPTOGRAPHIC KEYS

PRIORITY CLAIM

This application is a national stage application of International Patent Application No. PCT/EP2020/073885, filed Aug. 26, 2020, the disclosure disclosures of which is hereby incorporated in its entirety by reference.

TECHNICAL FIELD

Embodiments presented herein relate to a method, a cryptographic key generator device, a computer program, and a computer program product for generating a cryptographic key for a user.

BACKGROUND

Identification through biometrics data, such as fingerprints, retinal scans, facial scans or the like, is a common security feature on contemporary handheld devices. Such identification is often used as complement to, or replacement of, passwords or security codes. The common name for such techniques is biometric security.

When a piece of biometric data, e.g. a fingerprint, is supplied as input to the device, the biometric data is interpreted by a biometrics reader, e.g. a fingerprint reader, which digitalizes the input. After digitalization, the data is processed by an algorithm which extracts a set of features (sometimes called minutiae). A feature can have many properties. Examples of properties are a shape, a size, an exact position, a relative position, its nearest neighboring features, etc. The feature algorithm is designed with regards to what features to identify and how data should be encoded.

Prior to first time usage of biometric security on a device, the user commonly supplies several sets of biometric features which are combined into a template. A template is a set of unique features which are likely to be present in the user's biometrics data. The process of registering a template is called enrollment.

One drawback of using biometrics data is that it has high probability to differ between readings. This requires either acceptance of partial matches or helper data and error correction on the input to match the template. Helper data can assist in error correcting sets of biometric features similar to the template. A set of biometric features $S_1$ can be said to be similar to another set of biometric features $S_2$ if most features in $S_1$ also exist in $S_2$ or if the features in $S_2$ has low distance to $S_1$. How the distance is measured is dependent on how the features are implemented. The distance can e.g. be measured using the Hamming distance or Euclidian distance.

When biometrics data is used for authentication, the set of biometric features is compared to the template to determine if authentication was successful. In the field of biometric cryptography, on the other hand, the template is commonly not stored on the device after enrollment. Instead it is used to produce a biometric key, that is, a cryptographic key created using biometrics data. One technique to produce a biometric key, given the problem of heterogeneity between different inputs from the same source, is transform the input using secure sketching.

In secure sketching, the template, $S_1$, is enrolled by the user. From the input, helper data is extracted. Once the helper data has been stored, the template can be discarded. When the user presents a new set of biometric features, $S_2$, at a later point in time, the helper data is used as input to the secure sketching algorithm. If $S_2$ is sufficiently close to $S_1$, then $S_1$ is recreated.

Another alternative is fuzzy extraction, where input $S_1$ is inputted to a fuzzy extractor which outputs a deterministic random binary string R. The term fuzzy in the concept of fuzzy extractor comes from the fact that if $S_2$ is inputted and $S_2$ is sufficiently close to $S_1$, the fuzzy extractor still outputs the deterministic random binary string R. Just as in secure sketching, helper data is used to facilitate the recreation.

There is a tradeoff between security and availability depending on how much difference there can be between $S_1$ and $S_2$ to still produce the correct output.

Biometric data can be used to create biometric based cryptographic keys. One issue with current solutions is that an attacker can recreate the cryptographic key on their own device. For example, if a fingerprint is stolen or the user is tricked into submitting the user's fingerprint to the attacker's device, the attacker can recover the biometric data and recreate the cryptographic key.

Hence, there is still a need for more secure generation of biometric based cryptographic keys.

SUMMARY

An object of embodiments herein is to enable secure generation of biometric based cryptographic keys.

According to a first aspect there is presented a method for generating a cryptographic key for a user. The method is performed by a cryptographic key generator device. The method comprises authenticating the user using biometrics data read from the user using a biometrics reader. The method comprises obtaining, only when having authenticated the user, a Physically Unclonable Function (PUF) response from a PUF entity by providing a challenge based on biometrics response data to the PUF entity. The biometrics response data is a function of the biometrics data. The method comprises generating the cryptographic key using a cryptographic function and by seeding the cryptographic function with the PUF response.

According to a second aspect there is presented a cryptographic key generator device for generating a cryptographic key for a user. The cryptographic key generator device comprises processing circuitry. The processing circuitry is configured to cause the cryptographic key generator device to authenticate the user using biometrics data read from the user using a biometrics reader. The processing circuitry is configured to cause the cryptographic key generator device to obtain, only when having authenticated the user, a PUF response from a PUF entity by providing a challenge based on biometrics response data to the PUF entity. The biometrics response data is a function of the biometrics data. The processing circuitry is configured to cause the cryptographic key generator device to generate the cryptographic key using a cryptographic function and by seeding the cryptographic function with the PUF response.

According to a third aspect there is presented a cryptographic key generator device for generating a cryptographic key for a user. The cryptographic key generator device comprises an authenticate module configured to authenticate the user using biometrics data read from the user using a biometrics reader. The cryptographic key generator device comprises an obtain module configured to obtain, only when having authenticated the user, a PUF response from a PUF entity by providing a challenge based on biometrics response data to the PUF entity. The biometrics response data is a function of the biometrics data. The cryptographic key generator device comprises a generate module configured to generate the cryptographic key using a cryptographic function and by seeding the cryptographic function with the PUF response.

According to a fourth aspect there is presented a computer program for generating a cryptographic key for a user. The computer program comprises computer program code which, when run on a cryptographic key generator device, causes the cryptographic key generator device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable secure generation of biometric based cryptographic keys.

Advantageously, in a scenario where an attacker targets a user and manages to steal the biometrics data, the attacker will not be able to use any stolen biometrics data to recreate the cryptographic key on a different device (since this other device does not have an identical PUF entity).

Advantageously, in another scenario where the attacker has access to the device but not the biometrics data, the attacker will not be able to recreate the cryptographic key. Even if the attacker would be able to observe the PUF challenge used to create the cryptographic key, it is of little use as the attacker cannot know what biometrics data is needed to create the specific challenge.

Advantageously, the proposed method and cryptographic key generator device make it impossible for an attacker to recreate the cryptographic key without having physical access to the device and the biometrics data of the user.

Advantageously, the proposed method and cryptographic key generator device enable the generation of unique cryptographic keys for different users. This enables a multi-user device where no sensitive cryptographic keys are stored on the device. All cryptographic keys are generated and made available only when the correct biometrics data is supplied.

Advantageously, the proposed method and cryptographic key generator device combine authentication and key creation.

Advantageously, the proposed method and cryptographic key generator device allow anonymous enrollment. For example, a salt (i.e., a random binary string) can be used to make the template unique and make two templates enrolled by the same user indistinguishable from templates enrolled by other users.

Advantageously, the proposed method and cryptographic key generator device are implementable using any type of biometrics reader and type of PUF entity capable of handling at least as many PUF challenges as users.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 11 is a schematic diagram showing functional units of a cryptographic key generator device according to an embodiment;

FIG. 12 is a schematic diagram showing functional modules of a cryptographic key generator device according to an embodiment; and FIG. 13 shows one example of a computer program product comprising computer readable storage medium according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for more secure generation of biometric based cryptographic keys.

The embodiments disclosed herein therefore relate to mechanisms for generating a cryptographic key for a user. In order to obtain such mechanisms there is provided a cryptographic key generator device, a method performed by the cryptographic key generator device, a computer program product comprising code, for example in the form of a computer program, that when run on a cryptographic key generator device, causes the cryptographic key generator device to perform the method.

In some aspects, at least some of the herein disclosed embodiments are based on combining the device-unique properties of a PUF with the person-unique properties of biometric identification. By combining these properties a new cryptographic primitive, a biometrically locked PUF response (BLPR), can be created. The BLPR can in turn be used to create a biometrically locked device unique key (BLDUK). A BLDUK is a key which can only be obtained on a single device by a single user presenting a pre-defined biometrics data, such as a fingerprint.

In some examples, when the user supplies new biometrics data, it is first read, then error corrected (optionally), and finally used to create a challenge for the PUF entity. In one embodiment, user supplied data is combined with the biometrics data to create the challenge. The PUF entity is locked to only receive challenges created using biometrics data. Hence, an attacker cannot directly control the input to the PUF entity unless having access to the biometrics data. Each registered user gets access to a unique key which is never stored on the device, but instead recreated when the user supplies biometrics data. One way to achieve this is for the users to register a template on the device prior to first usage. This template can be used to extract helper data, and the helper data can be used to correct future the biometrics data.

The user is authenticated prior to using the PUF entity. In other words, a user which is not enrolled is not able to produce a response from the PUF entity.

Figure 1:
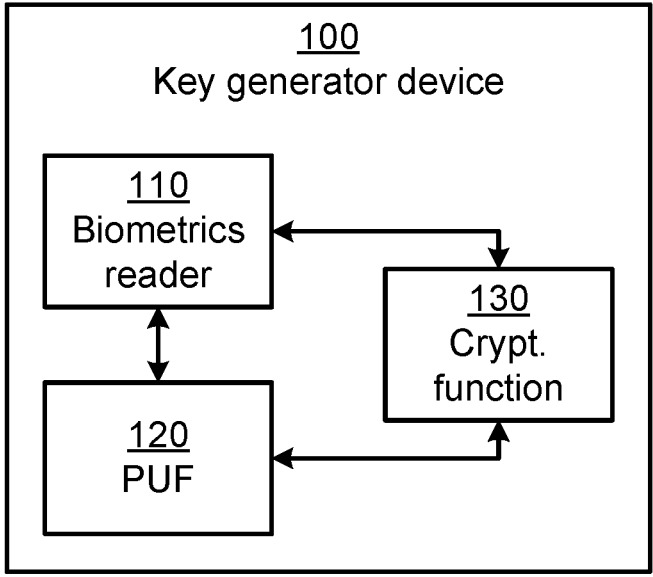
FIG. 1 is a schematic diagram illustrating a cryptographic key generator device according to embodiments.

FIG. 1 is a schematic diagram illustrating a cryptographic key generator device 100 according to an embodiment. The cryptographic key generator device 100 comprises a biometrics reader 110, a PUF entity 120, and a cryptographic function 130.

There could be different examples of biometrics readers 110. In some non-limiting examples the biometrics reader 110 is any of: a fingerprint readers, an iris scanner, a face scanner, or any combination thereof.

In general terms, the PUF entity 120 is configured to create a unique response, hereinafter denoted PUF response, by using implicit or explicit randomness. The PUF response can be used for cryptographic purposes or device identity purposes. For example, the PUF response can be used to create a unique device identity or a device unique key, without having to store the key in e.g. BBRAM or OTP memory. Hence, certain types of attack, such as stealing a key from a device using a PUF entity 120, are made more difficult, as any created key is never stored on the device.

The PUF response is created by exploited implicit or explicit randomness. Implicit randomness can be regarded as unpredictable manufacturing differences in semiconductor devices. Explicit randomness on the other hand implies that the randomness is not there during manufacturing but introduced at a later stage. The PUF entity 120 might comprise, or implement, one or several subfunctions, which each contributes with a part of the PUF response. Non-limiting examples of such subfunctions are ring-oscillators and uninitialized SRAM memory cells. In this respect, ring-oscillators, might be regarded as an uneven number of signal inverters in a ring which use gate delay propagation as randomness source. The PUF response might then be defined from a comparison between two or more ring-oscillators, where the number of oscillations at a given point is measured. The result (i.e., the PUF response) can e.g. be the identifier of the fastest, or slowest, ring oscillator. In terms of uninitialized SRAM memory cells, these have two possible states; logic zero and logic one. Prior to being powered up, the memory cells are in neither state. At powerup, each memory cell stabilizes in one of the two states. The PUF response is then defined by the entered state.

PUF entities 120 can generally be divided into two different categories; strong and weak. The former can produce several different PUF responses by using different challenges (usually a binary string of a fixed length) as input. The latter only allows one or a few challenges. Both types of PUF entities 120 can be used for generating a device identity and to protect cryptographical keys, while only strong PUFs should be used for remote authentication of a device. Some types of PUF entities 120 additionally require helper data to function properly, i.e. to increase the possibility of recreating the same response given the same challenge.

As will be further disclosed next, the cryptographic function 130 is configured to generate a cryptographic key using information from the biometrics reader 110 and the PUF entity 120 as input.

Figure 2:
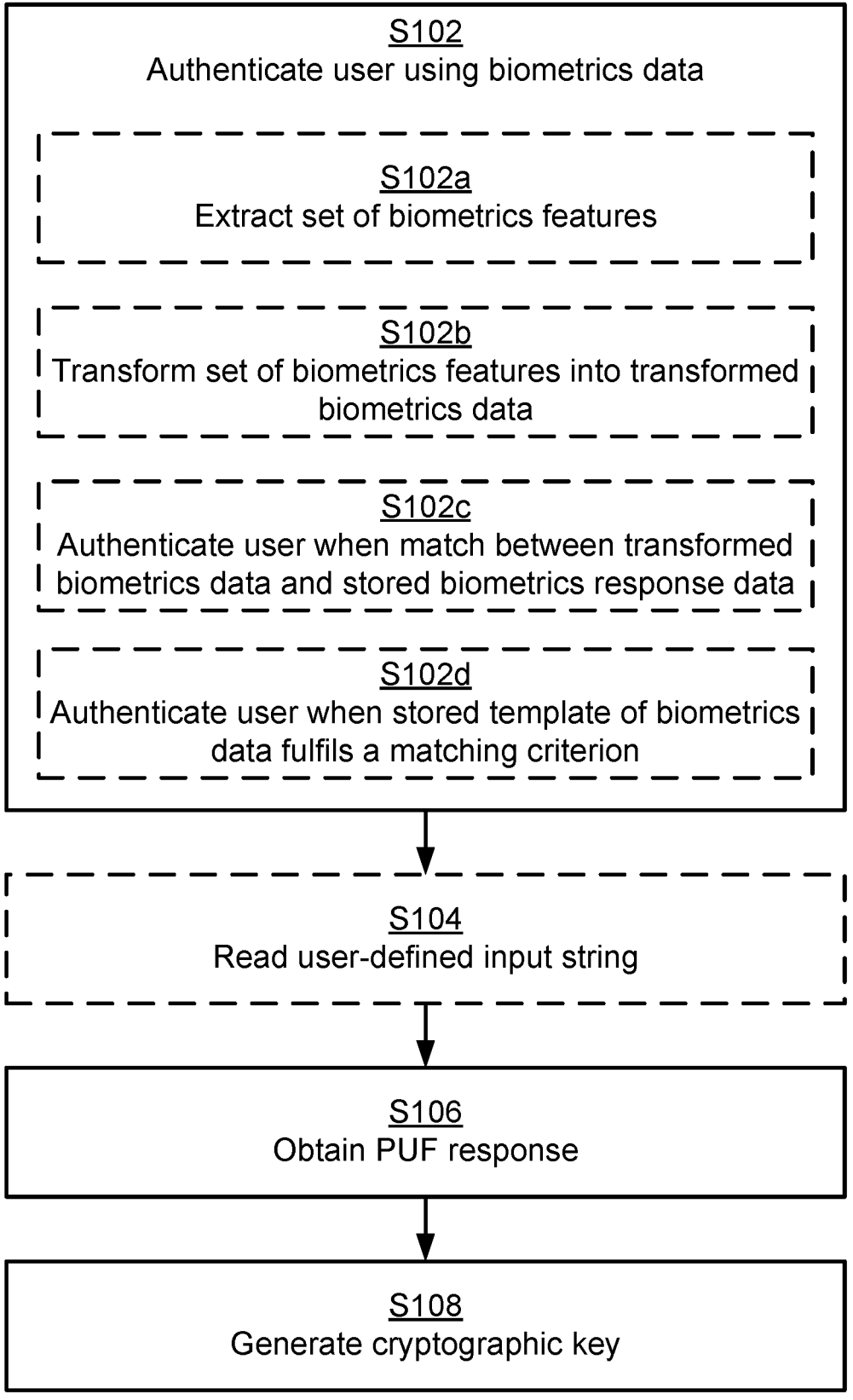
FIG. 2 is a flowchart of methods according to embodiments.

FIG. 2 is a flowchart illustrating embodiments of methods for generating a cryptographic key for a user. The methods are performed by the cryptographic key generator device 100. The methods are advantageously provided as computer programs 1320.

S102: The cryptographic key generator device 100 authenticates the user using biometrics data I, J read from the user using a biometrics reader 110.

S106: The cryptographic key generator device 100 obtains, only when having authenticated the user, a PUF response P from a PUF entity 120 by providing a challenge C based on biometrics response data R* to the PUF entity 120. The biometrics response data R* is a function of the biometrics data I, J.

S108: The cryptographic key generator device 100 generates the cryptographic key K using a cryptographic function 130, F and by seeding the cryptographic function 130, F with the PUF response P.

This method enables the user to be authenticated in the same process as the user-unique cryptographic key K is created.

There could be different usage of the cryptographic key K. For example, the cryptographic key K could be used as a key for authentication, the cryptographic key could be used to setup a session key for external communication, and the cryptographic key K could be used in scenarios where biometric based encryption is used, e.g. to encrypt storage and/or files.

Embodiments relating to further details of generating a cryptographic key K for a user as performed by the cryptographic key generator device 100 will now be disclosed.

As disclosed above, the PUF response P, on which the cryptographic key K depends, in turn on biometrics response data R*. The PUF response P might therefore be regarded as being a Biometrically Locked PUF response (BLPR) which is unique for the device-user combination and can only be generated using the biometrics data of a given user. Since the cryptographic key K thus might be regarded as depending on the BLPR, the cryptographic key K might therefore be regarded as being a Biometrically Locked Device Unique Key (BLDUK), i.e. a key which is only available to a specific user on a specific device.

During an enroll process (as illustrated in the enroll process 300 of FIG. 3 which will be further described below), the user might supply several pieces of biometric data to the biometrics reader 110. The read inputs might be subjected to a preprocessing algorithm. Depending on what type of biometrics data is used, the purpose and effect of the preprocessing algorithm will vary. A fingerprint, for example, needs alignment while a retina scan does not. After preprocessing, a feature extractor might interpret the preprocessed biometrics data and extract a template, i.e. a set of biometric features, that is unique and continuously present in the biometrics data. Once the template has been created, it might be sent to a feature corrector. That is, in some embodiments, the set of biometric features S is subjected to error correction.

In some examples, fuzzy extraction is used on the set of biometrics features S. In fuzzy extraction, the feature corrector supplies its output to a transformation function. Hence, the goal is not to recreate the original template but instead to generate a deterministic response, i.e., a random binary string R, that would be produced by the fuzzy extractor using the template as input. To enable this, the template is given to the feature corrector which uses it to create a new entry H in a helper data database, intended to facilitate recreation of R at a later stage. In this respect, the helper data database might store entries of error correction-data which is registered during the enroll process. The helper data can be used to assist in recreating a template from a slightly different set of biometric features, read at a later point in time. The confidentiality of the entries in the helper data database is not sensitive, but the integrity should be protected. Integrity protection can be achieved in many ways, i.e., dedicated storage area, one-time programmable storage, or integrity protection using e.g. message authentication codes or signatures.

The helper data entry H in itself is designed to minimize information leakage with the goal to neither reveal R, nor the template or the input needed to create R. The helper data can e.g. be embodied by syndromes used by error-correcting codes such as Reed-Solomon codes. When the helper data has been stored in the database, R is stored in an authentication database. The template can then be discarded. Only users which can present input which is transformed into a deterministic response registered in the authentication database are allowed to access the PUF entity 120. In this respect, for each user, a deterministic response, or a one-way transformed (e.g. hashed) template, can be stored in an authentication database. This database can be used to validate that the correct helper data has been applied (and thereby recreated the response/template).

To increase the anonymity of each deterministic response in the authentication database, a salt, i.e. a random binary string, can be stored with it. The salt is given to the feature corrector which uses it together with template to create R. The same salt is used when recreating R at a later point in time. The salt is not secret, but without knowing the correct biometrics data, the salt makes it impossible to tell if two deterministic responses belong to the same user or not.

A challenge creator could be placed in between the transformation function and the PUF entity. This construction is intended for usage with PUF entities where not all outputs of the feature corrector are valid challenges. The challenge creator is configured to deterministically translate the input into a challenge. In this respect, the challenge creator might be regarded as implementing a function which takes an input and deterministically transforms the input to a valid challenge for the PUF entity. The challenge creator can be implemented by e.g. a hash function which uses the result as input until a valid challenge is produced; a lookup table which translates a challenge; or a fuzzy extractor which produces a valid deterministic response. If the PUF entity can handle all types of possible input, the challenge creator may be omitted.

Figure 4:
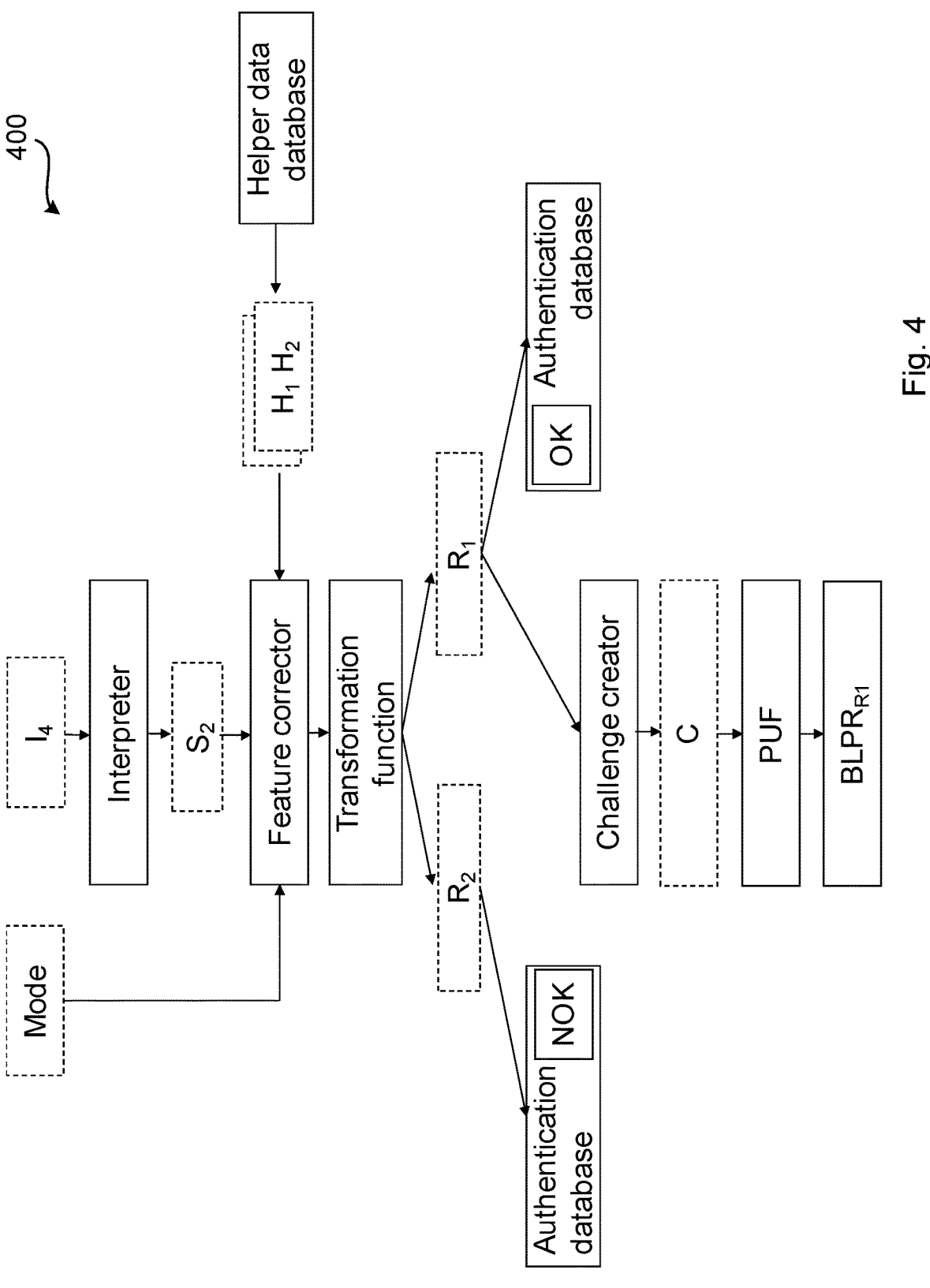

During a recreate process (as illustrated in the recreate process 400 of FIG. 4 which will be further described below), the user wants to recreate R and thereby be able to generate the cryptographic key K. The biometrics data of the user is read by the biometrics reader 110 and provided to the feature extractor. The feature extractor outputs a set of biometric features which is supplied to the feature corrector.

Each entry in the helper data database is compared to the set of biometric features inputted to the feature corrector in order to find a closest match. For each helper data entry, the output of the transformation function, R, is compared with the stored entries in the authentication database. If a match is found, R is sent to the challenge creator. If no match has been found in the authentication database, the process is aborted and the PUF entity is not activated. That is, in some embodiments (and with reference again to the flowchart of FIG. 2), the cryptographic key generator device 100 is configured to perform (optional) steps S102a, S102b, S102c as part of step S102:

S102a: The cryptographic key generator device 100 extracts a set of biometric features S from the biometrics data I, J.

S102b: The cryptographic key generator device 100 transforms the set of biometric features S into transformed biometrics data R.

S102c: The cryptographic key generator device 100 authenticates the user when the cryptographic key generator device 100 can find stored biometrics response data R* that fulfils a matching criterion for the transformed biometrics data R.

Alternatively, the cryptographic key generator device 100 authenticates the user when the cryptographic key generator device 100 can find a template T of the biometrics data that fulfils a matching criterion for the set of biometric features S. That is, in some embodiments (and with reference again to the flowchart of FIG. 2), the cryptographic key generator device 100 is configured to perform (optional) steps S102a, S102d as part of step S102:

S102a: The cryptographic key generator device 100 extracts a set of biometric features S from the biometrics data I, J.

S102d: The cryptographic key generator device 100 authenticates the user when the cryptographic key generator device 100 can find stored a template of biometrics data T that fulfils a matching criterion for the set of biometric features.

In some embodiments, each stored template T of the biometrics data I, J is associated with biometrics response data R*.

In some examples, the stored biometrics response data R* is stored on the cryptographic key generator device 100.

In some embodiments, the stored biometrics response data R* that fulfils the matching criterion equals the biometrics response data R* that is a function of the biometrics data I, J.

If the template consists of several discrete elements which are hashed individually, the feature corrector can start with a part of the set of biometric features and helper data. If the first part produces a partial match in the authentication database, a correction of the full set of biometric features is performed.

The output of the challenge creator is supplied as challenge to the PUF entity. If the feature corrector successfully reconstructed the template, the BLPR will be successfully generated by the PUF entity. The PUF entity might only receive input from the feature corrector or transformation function, i.e. the only way for a user to impact what output the PUF entity generates is to supply biometrics data. The PUF response can then be used as input to the cryptographic function for generating the cryptographic key K.

In some aspects (as illustrated in the enroll process 500 of FIG. 5 which will be further described below and in the recreate process 600 of FIG. 6 which will be further described below), secure sketching is used to, with assistance of helper data, recreate the original template rather than a random binary string. In contrast to fuzzy extraction, secure sketching does not use a transformation function. Hence, instead of deterministic response, a one-way transformed version of the template is stored in the authentication database. Just as with fuzzy extraction, a set of biometric features and helper data are used as input to the feature corrector. If the set of biometric features is close to the template (but contains occasional errors or missing features), the feature corrector transforms it to the template. That is, in some embodiments, the biometrics data I, J read from the user represents a set of biometric features S that is compared to a template T of the biometrics data. In further embodiments, each piece of stored biometrics response data R* represents a candidate template T of the biometrics data I, J to which the set of biometric features S is compared in order to find a best matching template T. It is also possible to use salt, as described above, to provide extra protection of the templates. The salt in this case is used as additional input to the one-way function (OWF).

Figure 7:
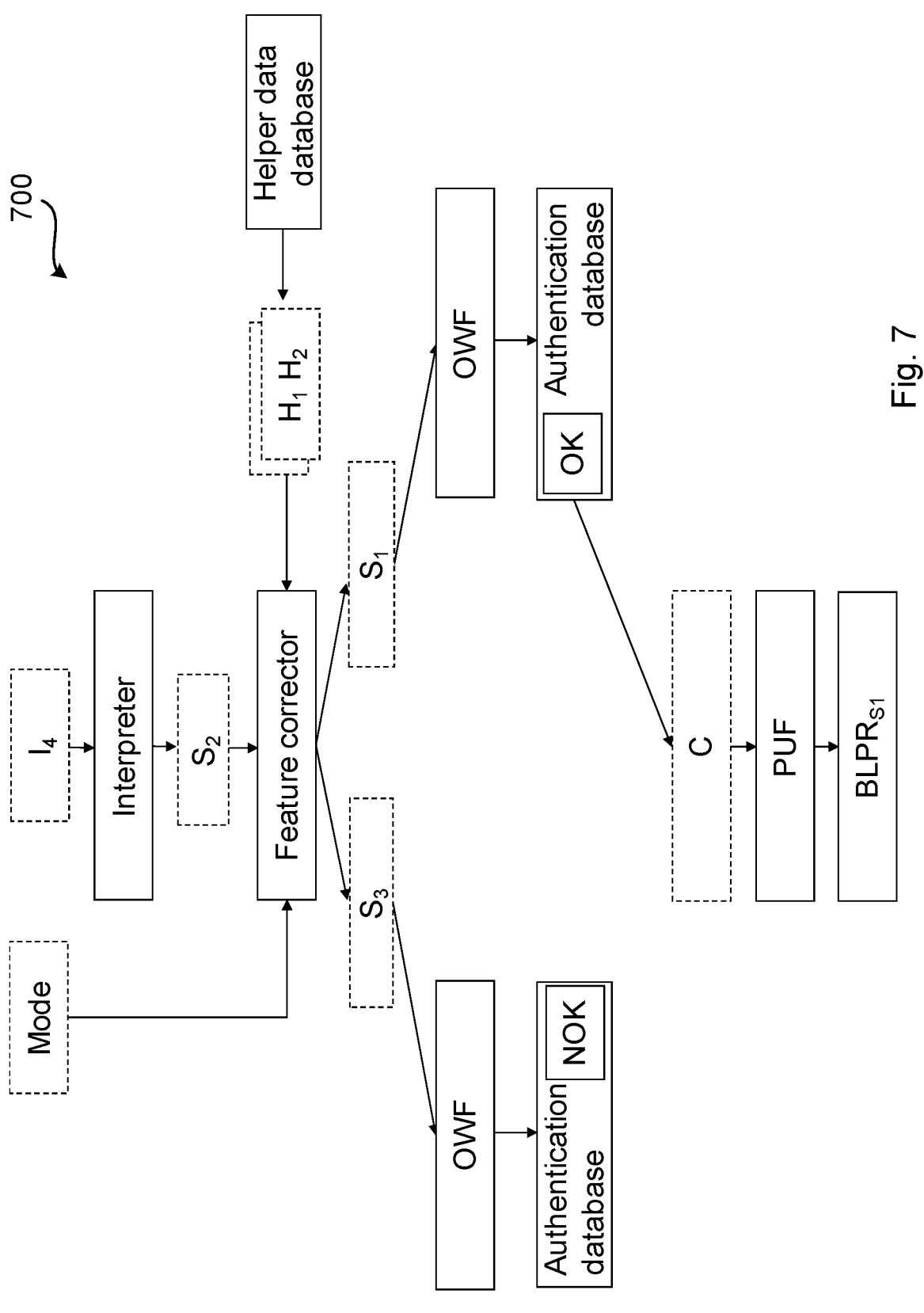

An alternative construction to using a challenge creator (as illustrated in the recreate process 700 of FIG. 7 for the recreate process), is to connect every entry in the authentication database to a PUF challenge during enrollment. I.e. a specific user is associated with a challenge, stored in the authentication database, and this challenge is used to create the BLPR. The challenge is only used if the user can present correctly matching biometrics data.

In some aspects, biometrics data from of at least two types are combined (as illustrated in the recreate process 800 of FIG. 8 for the recreate process which will be further described below). That is, in some embodiments, the biometrics data I, J of the user from at least two separate biometrics data sources are combined when authenticating the user. The different types might have separate interpreters and feature correctors. The output of the feature correctors could be combined into a single challenge by the challenge creator.

That is, in some embodiments, the data being a function of the biometrics data I, J is a function of biometrics data I, J of the user from at least two separate biometrics data sources. In some embodiments, there at least two separate biometric input sources of different types. That is, in an example, the at least two different types of biometrics data could represent one fingerprint and one face scan. In some embodiments, there at least two separate biometric input sources of same type. That is, in an example, the at least two different types of biometrics data could represent fingerprints from two different fingers.

In some aspects (as illustrated in the recreate process 900 of FIG. 9 which will be further described below), user-defined input is supplied to the challenge creator. That is, in some embodiments (and with reference again to the flowchart of FIG. 2), the cryptographic key generator device 100 is configured to perform (optional) step S104:

S104: The cryptographic key generator device 100 reads a user-defined input string as provided by the user.

The PUF response P is then a biometrical and user-defined unique PUF response P obtained by providing the user-defined input string and the biometrics response data R* as a joint challenge C to the PUF entity 120. Further, the cryptographic key K is then generated using the cryptographic function 130; F by seeding the cryptographic function 130; F with the biometrical and user-defined unique PUF response P.

By allowing user-defined input, the user can generate several different BLPRs using the same template and deterministic response. Thus, the user does not need to use an external key derivation function (KDF) to generate several different cryptographic keys. The user-defined input is not to be interpreted as a password in authentication sense, but rather a string of characters based on which the challenge creator can be created. That is, in some embodiments, authenticating the user is independent from the user-defined input string.

In some aspects (as illustrated in the recreate process 1000 of FIG. 10 which will be further described below), the reading of biometrics data is considered to be so exact that no feature correctors is needed. The set of biometric features created by the feature extractor could then be sent directly to the challenge creator. That is, in some embodiments, the set of biometric features S is not subjected to error correction.

Some representative examples based on at least some of the above disclosed embodiments will now be presented. In the below non-limiting examples, the following assumptions are made. The biometrics data is represented by a fingerprint. In the second, third and fourth example, secure sketching is used in lieu of fuzzy extraction. In the third example, the biometrics data is represented by a fingerprint and a retinal scan. No salt is used to provide extra protection for stored templates and/or deterministic responses in the authentication database. If not stated otherwise, the set of biometric features created by the feature extractor during the recreate process is sufficiently close to the template to enable recreation of the template and/or deterministic response.

Example 1

Enroll Process

Figure 3:
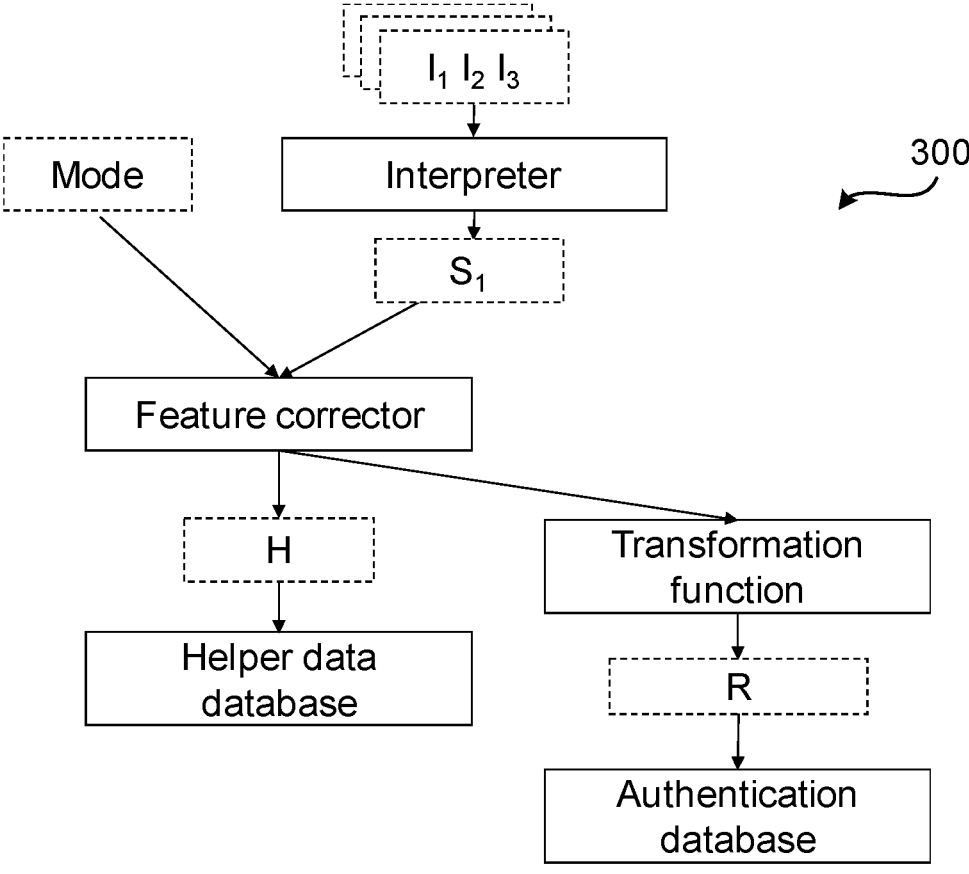
FIGS. 3-10 schematically illustrate enroll processes and recreate processes according to embodiments.

With reference to the enroll process 300 of FIG. 3, the user supplies fingerprints $I_1$, $I_2$ and $I_3$ as input. $I_1$, $I_2$ and $I_3$ are similar but not identical fingerprints from the same source (finger). The biometrics reader 110 registers fingerprints $I_1$, $I_2$ and $I_3$ and sends these fingerprints to a preprocessing algorithm. The preprocessing algorithm performs alignment, scaling and rotation on $I_1$, $I_2$ and $I_3$. A function, $F_{FE}$, for example implemented by a feature extractor, is applied to extracts a set of biometric features (or template), $S_1$, from the submitted fingerprints. That is, $F_{FE}(I_1, I_2, I_3) \rightarrow S_1$. The set of biometric features (or template) $S_1$ is supplied to a transformation function, $F_{TF}$. The transformation function outputs a deterministic response, denoted $R_1$. The deterministic response $R_1$ is stored in an authentication database to validate if $R_1$ was restored correctly in recreate mode. That is, $F_{TF}(s_1) \rightarrow R_1$. The feature corrector uses $S_1$ and $R_1$ to create helper data $H_1$. The helper data $H_1$ is saved in the helper data database. That is, $F_{FC}(S_1, R_1) \rightarrow H_1$. $S_1$ is discarded. The process can be repeated to create further helper data $H_2$, $H_3$, $H_4$, . . . etc. to populate the helper data database. For illustrative purposes, but without loss of generality, it is below assumed that the helper data consist of helper data $H_1$ and helper data $H_2$ only.

Recreate Process (Matching Input)

In this example, the set of biometric features is sufficiently close to the template and the template is recreated. With reference to the recreate process 400 of FIG. 4, the user supplies fingerprint $I_4$, which is close to $I_1$, $I_2$ and $I_3$ but not identical to any of them. The biometrics reader 110 registers $I_4$ and sends it to the preprocessing algorithm. The preprocessing algorithm performs alignment, scaling and rotation on $I_4$. The feature extractor extracts a set of biometric features, $S_2$, from the submitted fingerprint. That is, $F_{FE}(I_4) \rightarrow S_2$. The set of biometric features $S_2$ is supplied to the feature corrector. The feature corrector tries the first helper data entry, $H_1$, in the helper data base. If there is no match and no more helper data is available, the recreate phase is aborted. The helper data $H_1$ is supplied to the feature corrector, $F_{FC}$, which uses H to recreate the original set of biometric features, $S_1$. That is, $F_{FC}(S_2, H_1) \rightarrow S_1$. S1 is supplied to the transformation function whereby a deterministic response $R_1$, is created. That is, $F_{TF}(S_1) \rightarrow R_1$. The authentication database is queried for the deterministic response $R_1$. The deterministic response $R_1$ is present in the authentication database and the recreate attempt is thereby accepted. The deterministic response $R_1$ is provided as input to a challenge creator, $F_{CC}$. The challenge creator $F_{CC}$ transforms $S_1$ into a valid challenge, C, for the PUF entity 120. That is, $F_{CC}(R_1) \rightarrow C$. The challenge C is provided as input to the PUF entity 120. The PUF 120 creates a biometrically locked PUF response $BLPR_{R1}$, that is specific for $R_1$. That is, $F_{PUF}(C) \rightarrow BLPR_{R1}$. The PUF response can then be used as input to the cryptographic function for generating the cryptographic key K.

Recreate Process (Erroneous Input)

In this example, the set of biometric features is not sufficiently close to the template and the template is not recreated. With continued reference to FIG. 4, the user supplies fingerprint $I_5$. The biometrics reader 110 registers $I_5$ and sends it to the preprocessing algorithm. The preprocessing algorithm performs alignment, scaling and rotation on $I_5$. The feature extractor extracts a set of biometric features, $S_2$, from the submitted fingerprint. That is, $F_{FE}(I_5) \rightarrow S_2$.

The set of biometric features $S_2$ is supplied to the feature corrector. The feature tries the first helper data entry, $H_1$, in the helper data base. The helper data $H_1$ is supplied to the feature corrector, $F_{FC}$. The original set of biometric features is not recreated. Instead an incorrect set of biometric features $S_3$ is created. That is, $F_{FC}(S_2, H_1) \rightarrow S_3$. $S_3$ is supplied to the transformation function whereby a deterministic response $R_2$, is created. That is, $F_{TF}(S_3) \rightarrow R_2$. The feature corrector queries the authentication database for $R_2$. $R_2$ is not present in authentication database. Therefore, the next helper data entry $H_1$ is supplied to the feature corrector, $F_{FC}$. The original set of biometric features is not recreated. Instead an incorrect set of biometric features $S_4$ is created. That is, $F_{FC}(S_2, H_2) \rightarrow S_4$. $S_4$ is supplied to the transformation function whereby a deterministic response $R_1$, is created. That is, $F_{TF}(S_4) \rightarrow R_3$. The feature corrector queries the authentication database for $R_3$. $R_3$ is not present in authentication database. No more helper data is available, and the process is therefore aborted.

Example 2

Enroll Process

Figure 5:
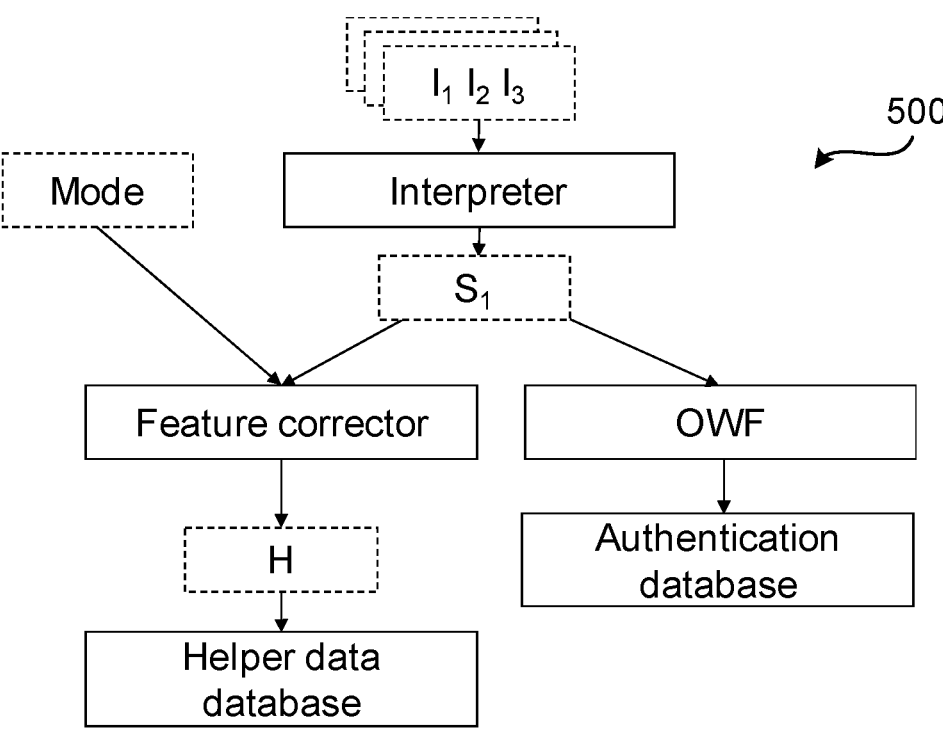
Figure 6:
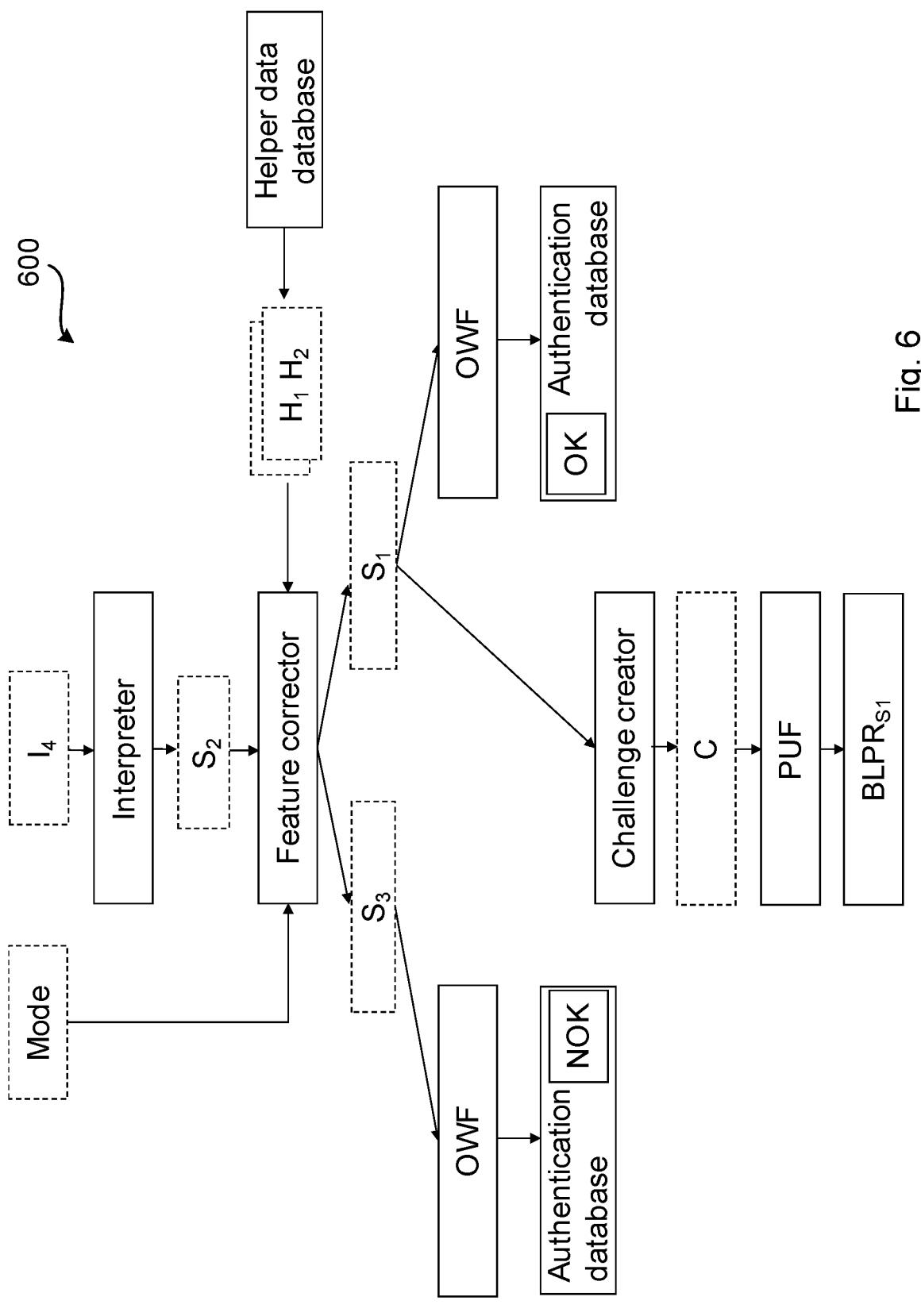

With reference to the enroll process 500 of FIG. 5, the user supplies fingerprints $I_1$, $I_2$ and $I_3$ as input. $I_1$, $I_2$ and $I_3$ are similar but not identical fingerprints from the same source (finger). The biometrics reader 110 registers fingerprints $I_1$, $I_2$ and $I_3$ and sends these fingerprints to a preprocessing algorithm. The preprocessing algorithm performs alignment, scaling and rotation on $I_1$, $I_2$ and $I_3$. A function, $F_{FE}$, for example implemented by a feature extractor, is applied to extracts a set of biometric features (or template), $S_1$, from the submitted fingerprints. That is, $F_{FE}(I_1, I_2, I_3) \rightarrow S_1$. The feature extractor, $F_{FE}$, extracts a set of biometric features (or template), $S_1$, from the submitted fingerprints. That is, $F_{FE}(I_1, I_2, I_3) \rightarrow S_1$. The set of biometric features (or template) $S_1$ is supplied to the feature corrector. The feature corrector uses $S_1$ to create helper data entry $H_1$. That is, $F_{FC}(S_1) \rightarrow H_1$. The helper data entry $H_1$ is saved in the helper data database. A one-way transformed version of $S_1$, $OWF(S_1)$ is stored in an authentication database to validate if $S_1$ was restored correctly in recreate mode. $S_1$ is discarded.

Recreate Process (Matching Input)

In this example, the set of biometric features is sufficiently close to the template and the template is recreated. With reference to the recreate process 600 of FIG. 6, the user supplies fingerprint $I_4$, which is close to $I_1$, $I_2$ and $I_3$ but not identical to any of them. The biometrics reader 110 registers $I_4$ and sends it to the preprocessing algorithm. The preprocessing algorithm performs alignment, scaling and rotation on $I_4$ The feature extractor extracts a set of biometric features, $S_2$, from the submitted fingerprint. That is, $F_{FE}(I_4) \rightarrow S_2$. The set of biometric features $S_2$ is supplied to the feature corrector. The feature corrector tries the first helper data entry, $H_1$, in the helper data base. If there is no match and no more helper data is available, the recreate phase is aborted. The helper data entry $H_1$ is supplied to the feature corrector, $F_{FC}$. The original template, $S_1$, is recreated. That is, $F_{FC}(S_2, H_1) \rightarrow S_1$. The feature corrector queries the authentication database for a one-way transformed set of biometric features $OWF(S_1)$. The one-way transformed set of biometric features $OWF(S_1)$ is present in the authentication database and the recreate attempt is thereby accepted. The original template, $S_1$, is provided as input to the challenge creator, $F_{CC}$. The challenge creator, $F_{CC}$, transforms $S_1$ into a valid challenge, C, for the PUF entity 120. That is, $F_{CC}(S_1) \rightarrow C$. The challenge C is provided as input to the PUF entity 120. The PUF 120 creates a biometrically locked PUF response $BLPR_{S1}$, that is specific for $S_1$. That is, $F_{PUF}(C) \rightarrow BLPR_{S1}$. The PUF response can then be used as input to the cryptographic function for generating the cryptographic key K.

Example 3

Enroll Process

In this example there are two types of biometrics data; fingerprints and retinal scans. The enroll process of example 3 is equal to example 2 but with the difference that the process is performed once for fingerprints $I_1$, $I_2$ and $I_3$ and once for retinal scans $J_1$, $J_2$.

Recreate Process

Figure 8:
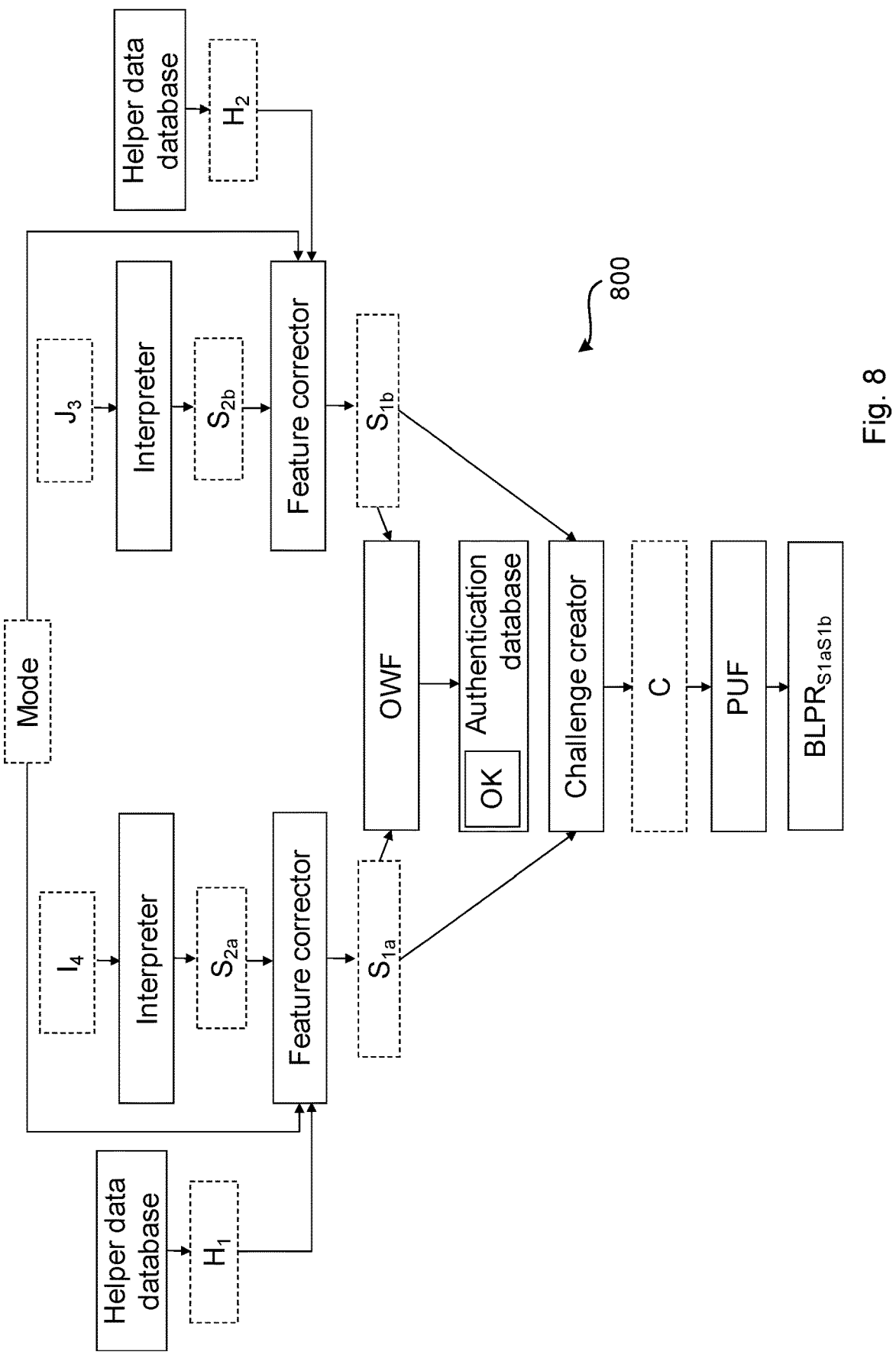

With reference to the recreate process 800 of FIG. 8, the user supplies fingerprint $I_4$, which is close to $I_1$, $I_2$ and $I_3$ but not identical to any of them. The biometrics reader 110 registers $I_4$ and sends it to the preprocessing algorithm. The preprocessing algorithm performs alignment, scaling and rotation on $I_4$. The feature extractor extracts a set of biometric features, $S_{2,f}$ (where the subscript f here and hereinafter denotes fingerprint), from the submitted fingerprint. That is, $F_{FE,f}(I_4) \rightarrow S_{2,f}$. The set of biometric features $S_{2,f}$ is supplied to the feature corrector. The feature corrector tries the first helper data entry, $H_{1,f}$, in the helper data base for fingerprints. If there is no match in the authentication database and no more helper data is available, the recreate phase is aborted. The helper data $H_{1,f}$ is supplied to the feature corrector, $F_{FC,f}$, whereby an error-corrected set of biometric features $S_{1,f}$ is created. That is, $F_{FC,f}(S_{2,f}, H_{1,f}) \rightarrow S_{1,f}$. A feature corrector queries the authentication database for a one-way transformed set of biometric features $OWF(S_{1,f})$. The one-way transformed set of biometric features $OWF(S_{1,f})$ is present in the authentication database and the recreate attempt is allowed to continue.

The user supplies retinal scan $J_3$, which is close to $J_1$ and $J_2$ but not identical to any of them. The biometrics reader 110 registers band sends it to the preprocessing algorithm. The preprocessing algorithm performs alignment, scaling and rotation on $J_3$. The feature extractor extracts a set of biometric features, $S_{2,r}$, (where the subscript r here and hereinafter denotes retinal), from the submitted retinal scan. That is, $F_{FE,r}(J_3) \rightarrow S_{2,r}$. The set of biometric features $S_{2,r}$ is supplied to the feature corrector. The feature corrector tries the first helper data entry, $H_{1,r}$, in the helper data database for retinal scans. If there is no match and no more helper data is available, the recreate phase is aborted. The helper data $H_{1,r}$ is supplied to the feature corrector, $F_{TF,r}$, whereby an error-corrected set of biometric features $S_{1,r}$, is created. That is, $F_{TF,r}(S_{2,r}, H_{1,r}) \rightarrow S_{1,r}$. A feature corrector queries the authentication database for the one-way transformed set of biometric features $(S_{1,r})$. The one-way transformed set of biometric features $(S_{1,r})$ is present in the authentication database and the recreate attempt is thereby accepted. The set $S = \{S_{1,f}, S_{1,r}\}$ is given as input to the challenge creator, $F_{CC}$. The challenge creator $F_{CC}$ transforms $S_1$ into a valid challenge, C, for the PUF entity 120. That is, $F_{CC}(\{S_{1,f}, S_{1,r}\}) \rightarrow C$. The challenge C is provided as input to the PUF entity 120. The PUF 120 creates a biometrically locked PUF response $BLPR_{S1,f+S1,r}$, that is specific for $\{S_{1,f}, S_{1,r}\}$. That is, $F_{PUF}(C) \rightarrow BLPR_{S1,f+S1,r}$. The PUF response can then be used as input to the cryptographic function for generating the cryptographic key K.

Example 4

Enroll Process

The enroll process for example 4 is equal to the enroll process of example 2.

Recreate Process

Figure 9:
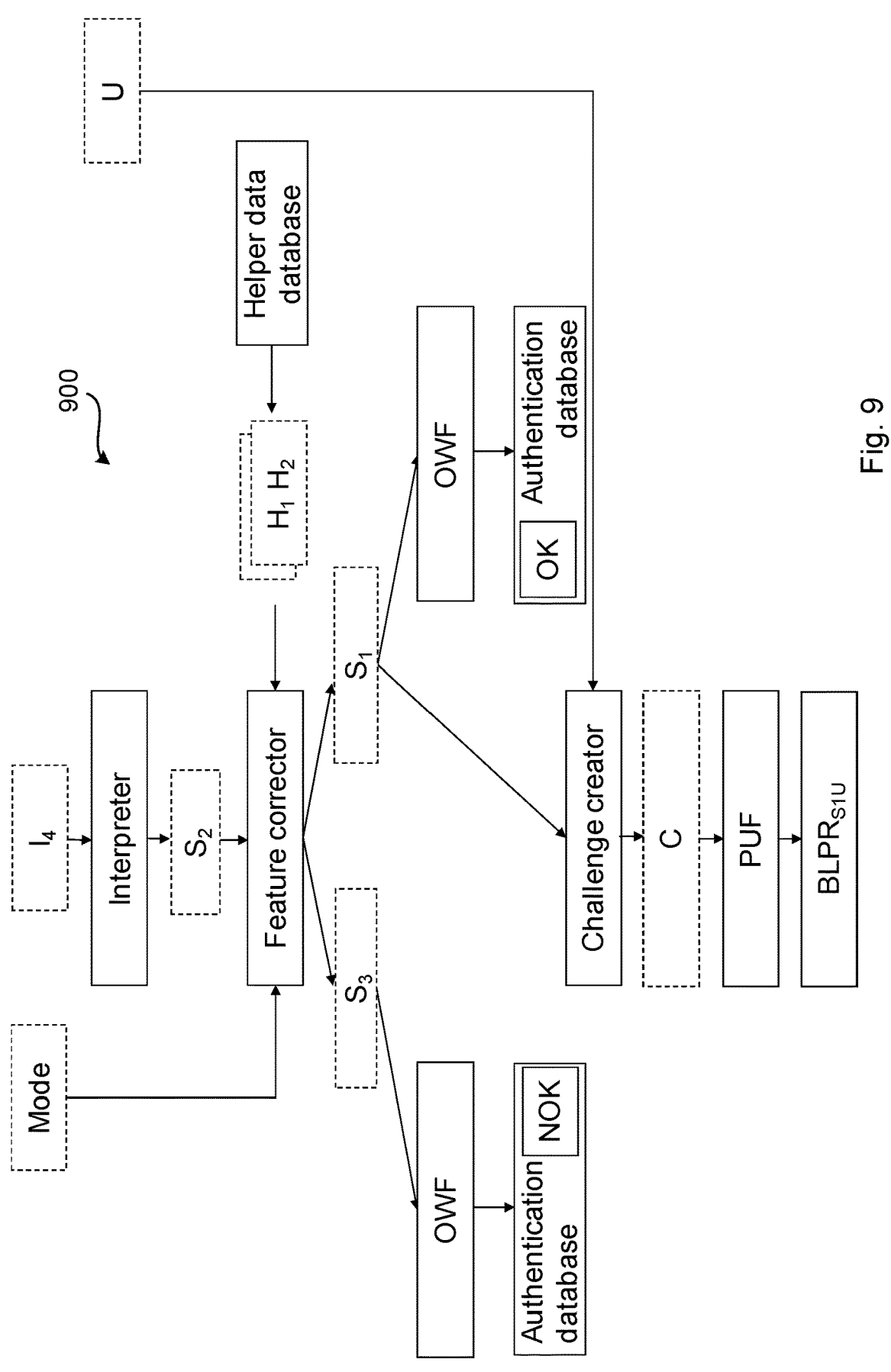

With reference to the recreate process 900 of FIG. 9, the user supplies fingerprint $I_4$, which is close to $I_1$, $I_2$ and $I_3$ but not identical to any of them. The biometrics reader 110 registers $I_4$ and sends it to the preprocessing algorithm. The preprocessing algorithm performs alignment, scaling and rotation on $I_4$. The feature extractor extracts a set of biometric features, $S_2$, from the submitted fingerprint. That is, $F_{FE}(I_4) \rightarrow S_2$. The set of biometric features $S_2$ is supplied to the feature corrector. The feature corrector tries the first helper data entry, $H_1$, in the helper data base. If there is no match and no more helper data is available, the recreate phase is aborted. The helper data $H_1$ is supplied to the feature corrector, $F_{FC}$, whereby an error-corrected set of biometric features S, is created. That is, $F_{FC}(S_2, H_1) \rightarrow S_1$. The feature corrector queries the authentication database for the one-way transformed set of biometric features $OWF(S_1)$. The one-way transformed set of biometric features $OWF(S_1)$ is present in the authentication database and the recreate attempt is thereby accepted. The user supplies a user-defined input, U. The set $\{S_1, U\}$ is given as input to the challenge creator, $F_{CC}$. The challenge creator $F_{CC}$ transforms $S_1$ and U into a valid challenge, C, that is provided as input to the PUF entity 120. The PUF 120 creates a biometrically locked PUF response $BLPR_{S1+U}$, that is specific for $\{S_1, U\}$. That is, $F_{PUF}(C) \rightarrow BLPR_{S1+U}$. The PUF response can then be used as input to the cryptographic function for generating the cryptographic key K.

Example 5

Enroll Process

The enroll process for example 5 is equal to the enroll process of example 2 but is without involvement of any feature corrector.

Recreate Process

Figure 10:
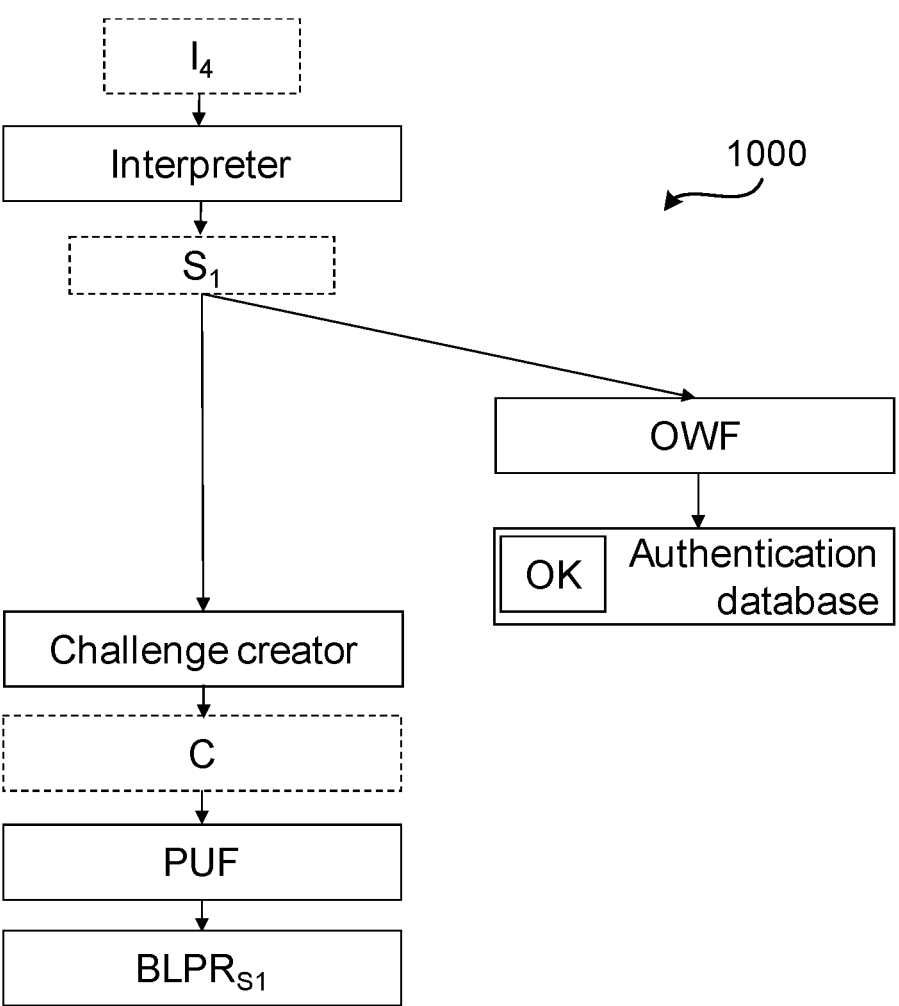

With reference to the recreate process 1000 of FIG. 10, the recreate process for example 5 is equal to the recreate process of example 2 but is without the feature corrector. The output of the feature extractor is presented to the authentication database.

FIG. 11 schematically illustrates, in terms of a number of functional units, the components of a cryptographic key generator device 100 according to an embodiment. Processing circuitry 1110 is provided using any combination of one or more of a suitable central processing unit (CPU), multiprocessor, microcontroller, digital signal processor (DSP), etc., capable of executing software instructions stored in a computer program product 1310 (as in FIG. 13), e.g. in the form of a storage medium 1130. The processing circuitry 1110 may further be provided as at least one application specific integrated circuit (ASIC), or field programmable gate array (FPGA).

Particularly, the processing circuitry 1110 is configured to cause the cryptographic key generator device 100 to perform a set of operations, or steps, as disclosed above. For example, the storage medium 1130 may store the set of operations, and the processing circuitry 1110 may be configured to retrieve the set of operations from the storage medium 1130 to cause the cryptographic key generator device 100 to perform the set of operations. The set of operations may be provided as a set of executable instructions.

Thus the processing circuitry 1110 is thereby arranged to execute methods as herein disclosed. The storage medium 1130 may also comprise persistent storage, which, for example, can be any single one or combination of magnetic memory, optical memory, solid state memory or even remotely mounted memory. The cryptographic key generator device 100 may further comprise a communications interface 1120 at least configured for communications with other entities, functions, nodes, and devices. As such the communications interface 1120 may comprise one or more transmitters and receivers, comprising analogue and digital components. The processing circuitry 1110 controls the general operation of the cryptographic key generator device 100 e.g. by sending data and control signals to the communications interface 1120 and the storage medium 1130, by receiving data and reports from the communications interface 1120, and by retrieving data and instructions from the storage medium 1130. Other components, as well as the related functionality, of the cryptographic key generator device 100 are omitted in order not to obscure the concepts presented herein.

FIG. 12 schematically illustrates, in terms of a number of functional modules, the components of a cryptographic key generator device 100 according to an embodiment. The cryptographic key generator device 100 of FIG. 12 comprises a number of functional modules; an authentication module 1210 configured to perform step S102, an obtain module 1270 configured to perform step S106, and a generate module 1280 configured to perform step S106. The cryptographic key generator device 100 of FIG. 12 may further comprise a number of optional functional modules, such as any of an extract module 1220 configured to perform step S102a, a transform module 1230 configured to perform step S102b, an authentication module 1240 configured to perform step S102c, an authentication module 1250 configured to perform step S102c, and a read module 1260 configured to perform step S104. In general terms, each functional module 1210-1280 may in one embodiment be implemented only in hardware and in another embodiment with the help of software, i.e., the latter embodiment having computer program instructions stored on the storage medium 1130 which when run on the processing circuitry makes the cryptographic key generator device 100 perform the corresponding steps mentioned above in conjunction with FIG. 12. It should also be mentioned that even though the modules correspond to parts of a computer program, they do not need to be separate modules therein, but the way in which they are implemented in software is dependent on the programming language used. Preferably, one or more or all functional modules 1210-1280 may be implemented by the processing circuitry 1110, possibly in cooperation with the communications interface 1120 and/or the storage medium 1130. The processing circuitry 1110 may thus be configured to from the storage medium 1130 fetch instructions as provided by a functional module 1210-1280 and to execute these instructions, thereby performing any steps as disclosed herein.

The cryptographic key generator device 100 may be provided as a standalone device or as a part of at least one further device. Alternatively, functionality of the cryptographic key generator device 100 may be distributed between at least two devices, or nodes. These at least two nodes, or devices, may either be part of the same network part or may be spread between at least two such network parts. Thus, a first portion of the instructions performed by the cryptographic key generator device 100 may be executed in a first device, and a second portion of the of the instructions performed by the cryptographic key generator device 100 may be executed in a second device; the herein disclosed embodiments are not limited to any particular number of devices on which the instructions performed by the cryptographic key generator device 100 may be executed. Hence, the methods according to the herein disclosed embodiments are suitable to be performed by a cryptographic key generator device 100 residing in a cloud computational environment. Therefore, although a single processing circuitry 1110 is illustrated in FIG. 11 the processing circuitry 1110 may be distributed among a plurality of devices, or nodes. The same applies to the functional modules 1210-1280 of FIG. 12 and the computer program 1320 of FIG. 13.

FIG. 13 shows one example of a computer program product 1310 comprising computer readable storage medium 1330. On this computer readable storage medium 1330, a computer program 1320 can be stored, which computer program 1320 can cause the processing circuitry 1110 and thereto operatively coupled entities and devices, such as the communications interface 1120 and the storage medium 1130, to execute methods according to embodiments described herein. The computer program 1320 and/or computer program product 1310 may thus provide means for performing any steps as herein disclosed.

In the example of FIG. 13, the computer program product 1310 is illustrated as an optical disc, such as a CD (compact disc) or a DVD (digital versatile disc) or a Blu-Ray disc. The computer program product 1310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320 is here schematically shown as a track on the depicted optical disk, the computer program 1320 can be stored in any way which is suitable for the computer program product 1310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for generating a cryptographic key (K) for a user, the method being performed by a cryptographic key generator device, the method comprising:

authenticating the user using biometrics data (I, J) read from the user using a biometrics reader;

obtaining, only when having authenticated the user, a Physically Unclonable Function (PUF) response (P) from a PUF entity by providing a challenge (C) based on biometrics response data (R*) to the PUF entity, wherein the biometrics response data (R*) is a function of the biometrics data (I, J); and generating the cryptographic key (K) using a cryptographic function (F) and by seeding the cryptographic function (F) with the PUF response (P), wherein the method further comprises reading a user-defined input string as provided by the user, wherein the PUF response (P) is a biometrical and user-defined unique PUF response (P) obtained by providing the user-defined input string and the biometrics response data (R*) as a joint challenge (C) to the PUF entity.

2. The method according to claim 1, wherein authenticating the user comprises:

extracting a set of biometric features(S) from the biometrics data (I, J);

transforming the set of biometric features(S) into transformed biometrics data (R); and authenticating the user when the cryptographic key generator device can find stored biometrics response data (R*) that fulfils a matching criterion for the transformed biometrics data (R).

3. The method according to claim 2, wherein the stored biometrics response data (R*) that fulfils the matching criterion equals the biometrics response data (R*) that is a function of the biometrics data (I, J).

4. The method according to claim 1, wherein authenticating the user comprises:

extracting a set of biometric features(S) from the biometrics data (I, J);

authenticating the user when the cryptographic key generator device can find stored a stored template of biometrics data (T) that fulfils a matching criterion for the set of biometric features(S).

5. The method according to claim 4, wherein each stored template (T) of the biometrics data (I, J) is associated with biometrics response data (R*).

6. The method according to claim 2, wherein the set of biometric features(S) is subjected to error correction.

7. The method according to claim 2, wherein the set of biometric features(S) is not subjected to error correction.

8. The method according to claim 1, wherein authenticating the user is independent from the user-defined input string.

9. The method according to claim 1, wherein biometrics data (I, J) of the user from at least two separate biometric input sources are combined when authenticating the user.

10. The method according to claim 1, wherein the data being a function of the biometrics data (I, J) is a function of biometrics data (I, J) of the user from at least two separate biometric input sources.

11. The method according to claim 9, wherein there at least two separate biometric input sources of different types.

12. The method according to claim 9, wherein there at least two separate biometric input sources of same type.

13. A cryptographic key generator device for generating a cryptographic key (K) for a user, the cryptographic key generator device comprising processing circuitry, the processing circuitry being configured to cause the cryptographic key generator device to:

authenticate the user using biometrics data (I, J) read from the user using a biometrics reader;

obtain, only when having authenticated the user, a Physically Unclonable Function (PUF) response (P) from a PUF entity by providing a challenge (C) based on biometrics response data (R*) to the PUF entity, wherein the biometrics response data (R*) is a function of the biometrics data (I, J); and generate the cryptographic key (K) using a cryptographic function (F) and by seeding the cryptographic function (F) with the PUF response (P), wherein the processing circuitry further performs reading a user-defined input string as provided by the user, wherein the PUF response (P) is a biometrical and user-defined unique PUF response (P) obtained by providing the user-defined input string and the biometrics response data (R*) as a joint challenge (C) to the PUF entity.

14. The cryptographic key generator device of claim 13, wherein authenticating the user comprises:

extracting a set of biometric features(S) from the biometrics data (I, J);

transforming the set of biometric features(S) into transformed biometrics data (R); and authenticating the user when the cryptographic key generator device can find stored biometrics response data (R*) that fulfils a matching criterion for the transformed biometrics data (R).

15. The cryptographic key generator device of claim 14, wherein the stored biometrics response data (R*) that fulfils the matching criterion equals the biometrics response data (R*) that is a function of the biometrics data (I, J).

16. The cryptographic key generator device of claim 13, wherein authenticating the user comprises:

extracting a set of biometric features(S) from the biometrics data (I, J);

authenticating the user when the cryptographic key generator device can find stored a stored template of biometrics data (T) that fulfils a matching criterion for the set of biometric features(S).

17. The cryptographic key generator device of claim 16, wherein each stored template (T) of the biometrics data (I, J) is associated with biometrics response data (R*).

18. The cryptographic key generator device of claim 14, wherein the set of biometric features(S) is subjected to error correction.

19. The cryptographic key generator device of claim 14, wherein the set of biometric features(S) is not subjected to error correction.

20. The cryptographic key generator device of claim 13, wherein authenticating the user is independent from the user-defined input string.

21. The cryptographic key generator device of claim 13, wherein biometrics data (I, J) of the user from at least two separate biometric input sources are combined when authenticating the user.

22. The cryptographic key generator device of claim 13, wherein the data being a function of the biometrics data (I, J) is a function of biometrics data (I, J) of the user from at least two separate biometric input sources.

23. The cryptographic key generator device of claim 22, wherein there at least two separate biometric input sources of different types.

24. The cryptographic key generator device of claim 22, wherein there at least two separate biometric input sources of same type.

* * * * *